Aug. 13, 1946.  M. P. MATUSZAK  2,405,704
FLOWMETER
Filed Oct. 21, 1943  2 Sheets-Sheet 1

INVENTOR.
Maryan P. Matuszak
BY
Darby & Darby.
Att'ys.

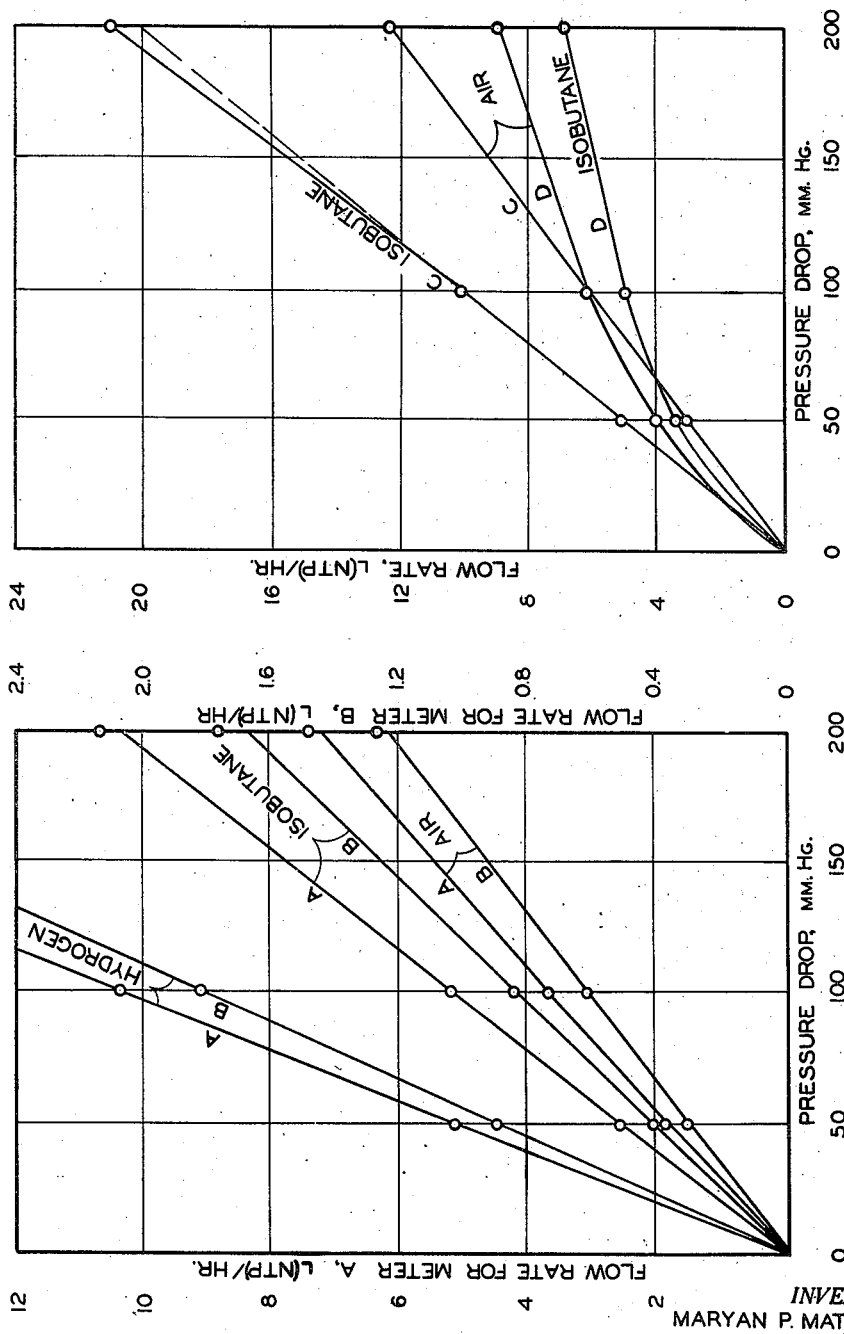

Patented Aug. 13, 1946

2,405,704

UNITED STATES PATENT OFFICE 2,405,704

FLOWMETER

Maryan P. Matuszak, Bartlesville, Okla., assignor to Phillips Petroleum Company, a corporation of Delaware Application October 21, 1943, Serial No. 507,167

7 Claims. (Cl. 73—205)

This invention relates to the measurement of the rate of flow of fluids; and, in its more specific aspects, is concerned with improved apparatus for readily determining the rate of flow of various fluids, particularly gaseous and/or vaporous fluids.

Numerous devices for measuring the rate of flow of fluids have been developed and employed with greater or less success, heretofore. Among the generally known and commonly employed flowmeters for measuring ordinary fluid flow-rates are those which comprise a combined orifice and differential pressure gauge, such as the conventional U-tube manometer. These flowmeters include, as essential elements, a conduit through which the fluid is transmitted and having an orifice disposed across the interior thereof, and a U-tube manometer having one of its arms in communication with the interior of the conduit at a point upstream of the orifice and its other arm in communication with the interior of the conduit at a point downstream of the orifice. With this type of arrangement, when the rate of fluid flow through the conduit changes, the difference in pressure between the two arms of the manometer changes correspondingly. After the device has been suitably calibrated, the readings of the manometer provide measurements of the rate of fluid flow. Experience has shown that present day flowmeters of the character above described possess a number of disadvantages. For one thing the calibration of this class of flowmeters is as a rule laborious and time-consuming, since necessary measurements and calculations must be made for a plurality of differential pressures and readings within the operating range of the instrument. Another disadvantage of this type of flowmeter resides in the fact that solid particles, such as dust, that is entrained in the fluid, oftentimes become lodged or deposited in the orifice, thereby changing the effective size of the orifice and resulting in erroneous readings.

The flowmeter of the present invention contemplates and actually does completely obviate or substantially reduce the disadvantages and objections discussed above as will be readily comprehended by one skilled in the art as the instant disclosure progresses. Briefly stated, my invention comprises a device having an inlet and an outlet and adapted to be disposed across a conduit through which the fluid to be measured flows; a porous tubular member through which the fluid is transmitted on passing from the inlet to the outlet; and a differential pressure gauge. The characteristics of individual porous tubes are such that the calibration curve, for moderate differential pressures, is substantially a straight line. Although the combination of porous tube and differential-pressure gauge may if desired be constructed of any materials that are functionally suitable, it is recommended that construction material consisting primarily of glass be employed in the interest of simplicity.

With reference to the porous tube itself, the same may be fabricated from glass, as, for example, by employing one or more of the known techniques for making fritted or sintered glass discs. On the other hand, the porous tube may be made with equally satisfactory results for the purposes of my invention from any suitable commercially available porous ceramic refractory tube of proper configuration that is inert to the fluid to be measured and that preferably can be sealed directly to glass without the use of a cementing or other special uniting or assembling material. It is to be understood, however, that a suitable cement or similar material may be advantageously employed to effectively seal one or more of the porous tubes in the desired location within the remainder of the device of this invention. Unglazed refractory tubes, such as those ordinarily used for the insulation of thermocouple wires and readily obtainable in a variety of lengths, diameters and wall thickness from several sources, are entirely satisfactory and accordingly recommended. The type having a single bore is preferred because of its uniformity in wall thickness. I have found that such tubes may be joined directly and with a minimum of difficulty to heat-resistant glass of the class commonly referred to as "Pyrex," provided that care is taken to avoid appreciable overlapping with the glass in the use of porous tubes having a diameter greater than 1 mm. Porous tubes having a diameter of about 1 mm. are generally so thin-walled that they can be successfully joined to a glass tube of slightly greater diameter by inserting one end thereof a distance of about 1 or 2 mm. into the glass tube and then softening the glass tube in that region by the application of heat so that it contracts and unites with the porous tube, thereby obtaining an overlapping seal or joint. Porous tubes of considerable wall thickness cannot as a rule be united to the glass tube in this manner since the overlapping joints resulting therefrom are likely to crack and fail. Relatively thick walled porous tubes may, however, be effectively sealed or joined directly to glass tubes of substantially the same diameter by making the joint end-toend and without overlapping, either within or without the porous tube.

This invention has for its primary object the provision of an improved fluid flowmeter.

One important object of this invention is to provide a rate of fluid flow measuring device that is adapted to be calibrated more readily and quickly than orifice, capillary or like conventional types of fluid flowmeters.

Another important object of this invention is the provision of a flowmeter of the class indicated that is characterized by the fact that a substantially straightline relationship exists between the rate of flow of fluid therethrough and the differential pressure of the fluid thereacross.

A further important object of this invention is to provide a fluid flowmeter so constructed and arranged as to minimize the possibility of the same becoming clogged or otherwise fouled by solid particles entrained in the fluid being measured, to thereby obtain a device that is capable of being employed for extended periods of time without appreciable diminution in accuracy.

A still further object of this invention is to provide a flowmeter that is adapted to pass greater quantities of various gases, such as isobutane and other gaseous hydrocarbons, than air at corresponding differential pressures within the operating range of the flowmeter.

My present invention has for an additional object the provision of a device of the character indicated that is relatively simple in design, durable in construction and reasonable in initial and maintenance costs; and that is capable of performing its intended functions in an effective and efficient manner.

The foregoing as well as other objects and advantages will be readily apparent to persons skilled in the art upon a perusal of the following detailed description and annexed drawings which respectively describe and illustrate preferred embodiments of my instant invention, and wherein Figure 1 is an elevation view of a preferred embodiment of this invention;

Figure 3 is a graph showing several calibration curves obtained for two flowmeters of the type illustrated in Figure 1; and Figure 4 is a graph showing two calibration curves obtained for a flowmeter of the type illustrated in Figure 1 and corresponding curves obtained for a flowmeter employing the usual construction or orifice in place of a porous tube.

Figure 1:
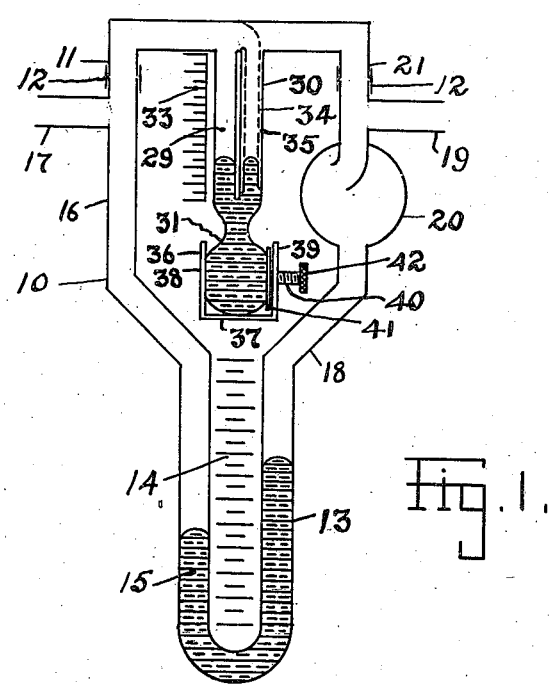

Referring first to Figure 1 for a full understanding of the construction of the apparatus illustrated therein, it will be noted that the same consists of a pair of separable and preferably transparent glass tubular units, namely, a lower tubular unit generally indicated by reference numeral 10 and an upper tubular unit generally indicated by reference numeral 11, which are in fluid communication and which are joined by tubular flexible distortable couplings 12. Rubber constitutes a suitable material for couplings 12 in many instances. However, should the fluid to be measured tend to attack rubber upon contact therewith and result in premature failure thereof, it is considered advisable to use an appropriate synthetic rubber composition or the like as the coupling material. This is advocated when the fluid under consideration is, for example, a hydrocarbon or a mixture of hydrocarbons.

Lower unit 10 includes a differential pressure gauge in the nature of a U-shaped manometer 13 that is provided with a calibrated scale 14 and that contains a quantity of suitable liquid 15 which is immiscible with the fluid to be measured. Mercury is a satisfactory manometer liquid in most cases. An upwardly extending tubular member 16 communicates with one arm of manometer 13 and with an inlet 17. A second upwardly extending tubular member 18 communicates with the other arm of manometer 13 and with an outlet 19. Interposed across member 18 and integral therewith is a bulb or surge chamber 20.

Upper unit 11 includes an inverted U-shaped tube 21 having a branch comprising a pair of parallel conduits 29 and 30 terminating in a deformable bulb 31. A porous tube 34 of the character referred to above is disposed within tube 21 at the junction of conduits 29 and 30 and is spaced therefrom to form an annular passage 35 therewith. The end of the porous tube 34 that is nearer inlet 17 is sealed to the interior of tube 21 and the other end of the porous tube is flanged and sealed to the interior of conduit 30 in the manner earlier described. Conduit 29 is provided with a scale 33. Mercury reservoir 31 is deformable and the internal volume thereof may be altered by any convenient means, such as the clamping mechanism generally indicated by reference numeral 36 within which reservoir 31 is adapted to be positioned. Clamping mechanism 36 comprises a frame including a base 37 and sidewalls 38 and 39. A rod 40 is in threaded engagement with side wall 39 and extends therethrough. A plate 41 is preferably swivelly connected to one end of rod 40 while knurled hand wheel 42 is rigidly connected to the opposite end. It will be evident that by virtue of the construction shown and by reason of the deformable character of reservoir 31, the level of the mercury in conduit 29 and porous tube 34 may be adjusted at the will of the operator to thereby vary the effective length or active area of the porous tube. The internal diameter of porous tube 34 is preferably the same as the corresponding diameter of conduit 29 in order to facilitate judging the level of the mercury in the porous tube as indicated by the scale 33.

In practice, the fluid being measured enters the device of Figure 1 through inlet 17, flows into conduits 29 and 30 and passes through the wall of porous tube 34 into annular space 35, and is then discharged by way of outlet 19. The back pressure exerted by porous tube 34 is measured by manometer 13 as indicated by calibrated scale 14. As this pressure varies with the rate of flow of the fluid through the device, the reading of the manometer provides a measure of the rate of fluid flow. Bulb 20 serves as a surge reservoir whereby any possibility of any manometer liquid 15 being discharged from the device by way of outlet 19 and thus loss is successfully prevented.

Although the porosity of an individual porous tube is usually substantially uniform along its entire length, the porosity of one tube may differ considerably from that of another tube. In the event it is desired to make two or more flowmeters of the same range, the relative porosity of two (or more) individual tubes may be determined by the temporary incorporation of each tube separately in an arrangement similar to that shown in Figure 1 and by passing a gas at a known flowrate through each, individually. From the data thus obtained, a simple calculation will enable a person skilled in the art to ascertain the length of one porous tube that is the equivalent functionally of a known length of the other porous tube. If desired, the porosity of a particular porous tube may be decreased by sintering or subjecting the same to incipient fusion at an elevated temperature, as by applying direct heat thereto with a gas-oxygen flame. If a porous tube of high refractoriness to heat is desired, it may be made of integrated particles of beryllium oxide.

Figure 2:
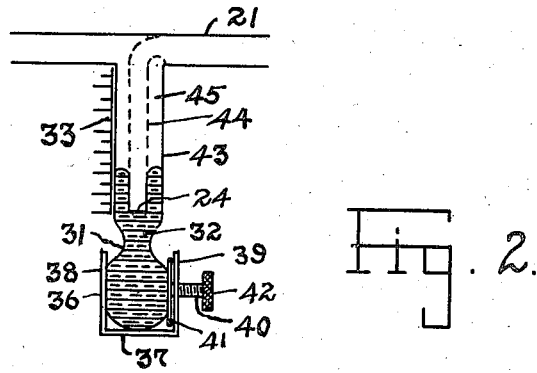
Figure 2 is an elevational view of a modified embodiment of this invention.

The modification of the invention depicted in Figure 2 is basically similar to that shown in Figure 1 and possesses the added advantages of being somewhat sturdier in construction and of presenting the outside of the porous tube upstream to the flow of fluid being measured. In this modification of the invention a single conduit 43 takes the place of both conduits 29 and 30 of Figure 1. A porous tube 44 is centrally disposed within conduit 43 and is spaced therefrom to form an annular passage 45 therewith. The upper end of porous tube 44 is sealed across conduit 21, as illustrated, and the lower end thereof is provided with a closure 24 which consists of a lens shaped glass element. It will be observed that the mercury or equivalent liquid 32 is admitted into annular space 45 to thereby vary the effective length of porous tube 44. Obviously the mercury or similar liquid employed in the apparatus of either Figure 1 or Figure 2 does not pass through the corresponding porous tube.

In Figure 3 are calibration curves for two flowmeters, A and B, of the type shown in Figure 1, for air, isobutane, and hydrogen. The curves are straight lines drawn through the experimentally determined values of the flow rates at a differential pressure or pressure drop of 100 mm. of mercury. The experimental values were obtained by collecting and timing the gas passing through the flowmeter at barometric pressure and room temperature, and calculating the volumes at standard conditions (N. T. P.). Experimental values are given also at pressure drops of 50 and 200 mm. of mercury. It will be observed that, although the experimental values for the flow rates at the extraordinary high pressure drop of 200 mm. of mercury do not fall quite on the corresponding straight line, the experimental values within the usual and most convenient pressure-drop range of up to about 100 mm. of mercury do fall on the straight line. Consequently, to obtain a calibration curve for a flow meter of the type herein disclosed, all that is necessary is to determine the flow rate at a pressure drop of 100 mm. of mercury (or a corresponding upper pressure drop for a manometer liquid other than mercury) and draw a straight line through the points representing this flow rate and the origin.

In Figure 4 are air and isobutane calibration curves for a flowmeter, C, of the type shown in Figure 1 and for a flowmeter, D, of the same general design but having an orifice made in the usual manner by constricting a glass tube. At a pressure drop of 100 mm. of mercury, these two flowmeters passed the same amount of air, 6.05 liters (N. T. P.) per hour. While for flowmeter C this one point was sufficient to determine the calibration curve, more than one point had to be determined for flowmeter D. Similarly, the single experimental value found with isobutane at a pressure drop of 100 mm. of mercury was sufficient for flowmeter C but was not sufficient for flowmeter D.

The wide applicabiltiy of the straight-line calibration for the flowmeters of this invention is indicated by the fact that flowmeters A, B, and C covered a tenfold range of flow rates, as is clear from Figures 3 and 4. In fact, the range of applicability of the straight-line calibration appears to hold for flowmeters of this type having all possible flow rates. It is thus clear that the flowmeters of this invention possess an important advantage in the ease and simplicity with which they are calibrated, whereby much time and labor can be saved.

Figures 3 and 4 illustrate another advantage of the flowmeters of this invention, namely that these flowmeters pass relatively more of a vapor, such as isobutane, than of a gas, such as air. This advantage is quite unexpected and unpredictable. According to Graham's well-known law of diffusion, it would be expected that a relatively heavy gas like isobutane would be passed through the flowmeter more slowly than would air; such a relationship is in fact shown in Figure 4 for the old type of flowmeter having a single constriction serving as an orifice. Although the present invention should not be restricted by any theory, it is possible that this unexpected effect may be caused by an adsorption of the vapor on the surfaces of the pores of the porous tube, whereby perhaps a substantially two-dimensional liquid layer is formed within the porous tube.

Thus it will be seen that the construction herein shown and described is well adapted to accomplish the objects of the present invention. It will be understood, however, that the invention may be embodied otherwise than here shown, and that in the form illustrated certain obvious changes in construction may be made. Therefore, I do not wish to be limited precisely to the construction herein shown except as may be required by the appended claims considered with reference to the prior art.

What I claim is:

1. In a fluid flowmeter, in combination, a conduit, an inlet for admitting fluid into the conduit, an outlet for discharging fluid from the conduit, a porous tube disposed in the conduit and spaced therefrom to form an annular passage therewith, one end of the porous tube being closed, means forming a seal between the other end of the porous tube and the interior of the conduit, sealing means for varying the effective length of the porous tube, and a pressure gauge for indicating the drop in fluid pressure occasioned by the passage of fluid through the wall of the porous tube.

2. A fluid flowmeter comprising a conduit, an inlet for admitting fluid into the conduit, an outlet for discharging fluid from the conduit, a porous tube disposed in the conduit and spaced therefrom to form an annular passage therewith, means forming a seal between each end of the porous tube and the interior of the conduit, means including a liquid immiscible with the fluid for varying the effective length of the porous tube, and a pressure gauge for indicating the drop in fluid pressure occasioned by the passage of fluid through the wall of the porous tube.

3. A fluid flowmeter comprising a conduit, an inlet for admitting fluid into the conduit, an outlet for discharging fluid from the conduit, a porous tube disposed in the conduit and spaced therefrom to form an annular passage therewith, means forming a seal between each end of the porous tube and the interior of the conduit, means for varying the effective length of the porous tube, said last mentioned means including a container of variable volumetric capacity communicating with the interior of the porous tube, and a liquid immiscible with the fluid in the container, and a pressure gauge for indicating the drop in fluid pressure occasioned by the passage of fluid through the wall of the porous tube.

4. The flowmeter in accordance with claim 3 wherein the means for varying the effective length of the porous tube recited therein includes a liquid immiscible with the fluid.

5. A fluid flowmeter comprising a conduit, an inlet for admitting fluid into the conduit, an outlet for discharging fluid from the conduit, a porous tube disposed in the conduit and spaced therefrom to form an annular passage therewith, one end of the porous tube being closed, means forming a seal between the other end of the porous tube and the interior of the conduit, means for varying the effective length of the porous tube, said means including a container of variable volumetric capacity communicating with the annular passage, and a liquid immiscible with the fluid in the container, and a pressure gauge for indicating the drop in fluid pressure occasioned by the passage of the fluid through the wall of the porous tube.

6. A fluid flowmeter comprising a conduit confining the flow of fluid and including an inlet and an outlet, a porous member disposed across the interior of the conduit and resisting the flow of fluid therethrough, a pressure gauge for indicating the drop in fluid pressure occasioned by the passage of fluid through the porous member, a sealing liquid in said conduit in contact with said porous member, and means for displacing the sealing liquid with respect to said porous member to vary the area thereof through which the fluid passes.

7. In a fluid flowmeter the combination comprising a conduit confining the flow of fluid and including an inlet and an outlet, a porous member disposed across the interior of the conduit and resisting the flow of fluid therethrough, a pressure gauge for indicating the drop in fluid pressure occasioned by the passage of fluid through the porous member, sealing means in said conduit and positioned adjacent said porous member, and means exterior of said conduit for displacing said sealing means with respect to the porous member to vary the active area thereof through which the fluid passes.

MARYAN P. MATUSZAK.